(12) United States Patent
Collura

(10) Patent No.: US 7,176,803 B2
(45) Date of Patent: *Feb. 13, 2007

(54) PAPER ROLL ANTI-THEFT PROTECTION

(75) Inventor: Blaise J. Collura, Tampa, FL (US)

(73) Assignee: Eastern Ribbon and Roll, Corp., Odessa, FL (US)

( * ) Notice: Subject to any disclaimer, the term of this patent is extended or adjusted under 35 U.S.C. 154(b) by 29 days.

This patent is subject to a terminal disclaimer.

(21) Appl. No.: 10/706,143

(22) Filed: Nov. 12, 2003

(65) Prior Publication Data

US 2004/0145479 A1  Jul. 29, 2004

Related U.S. Application Data

(63) Continuation of application No. 10/022,009, filed on Dec. 14, 2001, now Pat. No. 6,653,940.

(60) Provisional application No. 60/255,863, filed on Dec. 15, 2000.

(51) Int. Cl.
*G08B 13/14* (2006.01)

(52) U.S. Cl. ............... 340/572.8; 235/375; 235/492

(58) Field of Classification Search ............ 340/572.8
See application file for complete search history.

(56) References Cited

U.S. PATENT DOCUMENTS

| | | | |
|---|---|---|---|
| 3,689,003 A * | 9/1972 | Choinski | 242/571.7 |
| 4,471,547 A | 9/1984 | Koslow | |
| 5,255,865 A * | 10/1993 | Buell et al. | 242/613 |
| 5,447,829 A | 9/1995 | Tamai et al. | |
| 5,725,178 A | 3/1998 | Kewin | |
| 5,880,675 A * | 3/1999 | Trautner | 340/572.8 |
| 6,106,166 A * | 8/2000 | Spurr et al. | 396/578 |
| 6,201,474 B1 * | 3/2001 | Brady et al. | 340/572.8 |
| 6,222,453 B1 * | 4/2001 | Joyce | 340/572.8 |
| 6,334,587 B1 * | 1/2002 | Roder | 242/563 |
| 6,375,298 B2 * | 4/2002 | Purcell et al. | 347/14 |
| 6,527,356 B1 * | 3/2003 | Spurr et al. | 347/16 |
| 6,653,940 B2 * | 11/2003 | Collura | 340/572.8 |
| 6,802,659 B2 * | 10/2004 | Cremon et al. | 400/76 |
| 2002/0015066 A1 * | 2/2002 | Siwinski et al. | 347/19 |
| 2002/0067267 A1 * | 6/2002 | Kirkham | 340/572.7 |

FOREIGN PATENT DOCUMENTS

| | | |
|---|---|---|
| CA | 2281200 | 11/2000 |
| DE | 3912488 | 10/1990 |

(Continued)

*Primary Examiner*—Benjamin C. Lee
(74) *Attorney, Agent, or Firm*—Holland & Knight LLP (57) ABSTRACT

The invention comprises a method and system for preventing the unauthorized removal of paper rolls, such as cash register receipt paper rolls used by retailers, as well as the anti-theft paper roll and methods of preparation therefor. The method comprises affixing to the paper roll an electronic sensor, wherein the sensor emits a detectable signal; and detecting the presence of the sensor when it passes through or near a detection point at the retailer's location. In one embodiment of the invention, the sensor is an adhesive strip, affixed to the core of the paper roll, wherein the core of the paper roll comprises a flat surface integrally formed therein, onto which the sensor is affixed.

10 Claims, 2 Drawing Sheets

FOREIGN PATENT DOCUMENTS

| | | |
|---|---|---|
| DE | 19910197 | 10/2000 |
| JP | 2001-96826 | 4/2001 |
| JP | 2001-130163 | 5/2001 |
| WO | WO 94/28531 | 12/1994 |
| WO | WO 98/28213 | 7/1998 |

* cited by examiner

PAPER ROLL ANTI-THEFT PROTECTION

REFERENCE TO RELATED APPLICATIONS

This application is a continuation of U.S. application Ser. No. 10/022,009, filed Dec. 14, 2001 now U.S. Pat. No. 6,653,940, which claims priority to U.S. Provisional Application No. 60/255,863, filed Dec. 15, 2000, and which is incorporated herein by reference.

FIELD OF THE INVENTION

This invention relates to a method for preventing the theft or misappropriation of one or more paper rolls, particularly of those used to produce sales receipts from cash registers.

BACKGROUND OF THE INVENTION

A retailer must return cash or credit to an individual if a receipt is produced showing a sale, even if the receipt is fraudulent and the merchandise stolen. Thus, great lengths have been taken to prevent the theft or misappropriation of the paper rolls used for cash register receipts by third parties who would fraudulently claim sales have occurred, although they have actually never taken place. Consequently, numerous well known processes and methods have been directed to protecting retail register receipts by marking the paper itself, including using invisible inks, thermal inks, scratch off inks, multicolor and split ribbons to produce two color numbers and letters (e.g., U.S. Pat. No. 4,957,312), and adding a component to the ribbon which is visible only under ultraviolet (UV) illumination (e.g., U.S. Pat. No. 3,599,229).

Complex procedures have been tried, such as printing fixed information on register rolls with photoluminescent (UV responsive) ink, followed by the addition of variable information in UV responsive ink by the retailer at the register (e.g., U.S. Pat. No. 5,209,513) in an attempt to spot the return of merchandise covered by the fraudulent sales slip. However, none of these methods can effectively prevent fraud on the retailer if a preprinted roll of paper to be used in the register for receipts is stolen before it is ever used, permitting the thief to print his own register receipt to match stolen merchandise for "return." Likewise, the methods do not prevent a thief from generating and showing a fraudulently generated receipt when asked to show a receipt upon leaving the store with merchandise. Thus, a need existed, which is met by the present invention, for an anti-theft mechanism to prevent the theft of the paper roll itself.

Electronic article surveillance (EAS) security systems for detecting and preventing unauthorized removal of articles or goods from retail establishments and/or other facilities, such as libraries, are well known and widely used. In general, such security systems employ a label or security tag, which is affixed to, associated with, or otherwise secured to an article or item to be protected or its packaging. Security tags may take on many different sizes, shapes, and forms, depending on the particular type of security system in use, the type and size of the article, etc. In general, such security systems detect the presence of a security tag as the article to which it is attached passes through a security or surveillance zone or passes by or near a security checkpoint, interrogation zone or surveillance station.

Certain prior art security tags work primarily with radio frequency (RF) electromagnetic field disturbance sensing electronic security systems. Such electronic security systems generally establish an electromagnetic field in a controlled area through which articles must pass when being removed from the controlled premises. A tag having a resonant circuit is attached to each article, and the presence of the resonant circuit in the controlled area is sensed by a receiving portion of the system and an alarm is activated to denote the unauthorized removal of an article. Some markers of this type are intentionally removable at the checkout counter upon payment for the merchandise. Other types of markers are deactivated upon checkout. For instance, the resonant circuit can be deactivated, detuned, shielded, or removed by authorized personnel from an article following authorization (i.e., purchased or checked out) prior to removal from the premises. This permits passage of the article through the controlled area without activation of the alarm. On the whole, such mechanisms are successful although details, such as background noise and reliability can be negative factors in their use.

It is a common practice for the presence of a marker to be identified by detecting a signal reradiated by the marker in response to the field present in the interrogation zone. One type of EAS system is referred to as a harmonic system because it is based on the principle that a magnetic material passing through a magnetic field having a selected frequency disturbs the field and produces harmonic perturbations of the selected frequency. Such systems have been used for many years to provide security in retail establishments wherein the EAS tags are attached to the individual items of inventory within a store. The detection system is tuned to recognize certain harmonic frequencies and, if present, activates an alarm.

These markers may be integrated with a price label attached by adhesive to an article of merchandise, or imbedded or incorporated in the packaging for the article or in the article itself (e.g., U.S. Pat. No. 4,063,229). Other types of harmonic EAS systems are based on markers which include a thin strip or wire of magnetic material that responds to an alternating interrogation signal (e.g., U.S. Pat. Nos. 4,660,025 and 4,980,670). Such alarms include audible alarms and flashing lights that must be deactivated by the cognizant store personnel. U.S. Pat. No. 4,413,254 provides a good summary of the technology underlying conventional EAS systems.

Another type of EAS system employs magnetomechanical markers that include a magnetostrictive element (e.g., U.S. Pat. No. 4,510,489). Markers used in magnetomechanical systems are typically formed of a ribbon-shaped length of a magnetostrictive amorphous material contained in an elongated housing in proximity to a bias magnetic element. The magnetostrictive element is fabricated such that it is resonant at a predetermined frequency or bursts when the bias element has been magnetized to a certain level. The resulting signal radiated by the marker is detected by detecting circuitry.

As retail stores and shopping malls become larger, it is increasingly likely that both harmonic and magnetomechanical EAS systems will be in use in the same facility. For example, one department of a store may employ a magnetomechanical EAS system while another department may employ a harmonic EAS system. Common checkout counters may be shared by both departments, requiring checkout counter facilities to recognize and manage both types of markers, and thereby permitting retailers or manufacturers to use either type of marker without requiring additional scanning equipment at the checkout counter or security stations.

In order to improve the efficiency of operation of retail establishments, it has been proposed that EAS markers, including magnetomechanical markers, be applied to the items of merchandise before shipment to the retail establishment (e.g., U.S. Pat. No. 4,510,489). For example, it has been proposed that markers may be attached to the goods by their manufacturers before shipping. This practice has been called "source tagging," which means that an EAS marker or "tag" is applied to goods at the source of the goods. Techniques for "source tagging" goods that will ultimately be subjected to electronic article surveillance at a retail establishment include, e.g., U.S. Pat. No. 3,665,449, wherein a ferromagnetic strip is embedding into a library book; U.S. Pat. No. 4,151,405, wherein ferromagnetic strips are embedded into plastic, paper, wood, aluminum, stainless steel, etc; U.S. Pat. No. 4,626,311, wherein marker elements are embedded into a thermoplastic holder which is then fused within a garment; U.S. Pat. No. 4,686,154, wherein a tag is concealed within a seam or lining of an article of clothing; and U.S. Pat. No. 4,835,028, wherein a magnetostrictive wire is embedded in paper. However, such patents fail to account for the stresses and degradation of magnetic properties which occur when magnetic elements are embedded as described. Consequently numerous additional methods have been disclosed to overcome such deficiencies and improve performance (e.g., U.S. Pat. No. 5,499,015).

Nevertheless, conventional EAS systems are not foolproof and for various reasons are subject to missed detections and false alarms. These anomalous events may be dependent upon the nature of the products being tagged, and the electromagnetic environment of the particular installation site. Thus, it cannot be assumed that prior art sensors will be effective in every circumstance. Missed detection of a theft directly impacts a store's profit margin and can increase the temptation to steal. False alarms needlessly upset paying customers and undermine store employee confidence in the system. In fact, if the detection system is unreliable, the employees themselves might be tempted to misappropriate unused cash register paper rolls to commit fraud on their employer or other employers that use identical receipts for sales of merchandise.

Prior to the present invention there remained an unfulfilled need for protecting against theft of unused cash register receipt paper rolls, particularly those marked with special inks or labels to designate the retailer. The present invention, however, has met this need by providing, for the first time, a cash register receipt paper roll reliably protected by an anti-theft device, which is efficiently adaptable to sensors, detection devices and recording devices.

SUMMARY OF THE INVENTION

The present invention provides a method and system for preventing the unauthorized removal of a paper roll from a retailer. The present invention also provides a protected paper roll used for cash register receipts. The present invention can be used with a variety of paper roll sizes, a variety of core sizes, and a variety of sensors.

In a preferred embodiment of the present invention, a method is provided comprising: affixing to a paper roll an electronic sensor, wherein the sensor emits a detectable signal; and detecting the presence of the sensor when it passes through or near a detection point at a retailer's location. In the preferred embodiment, the sensor is affixed to the core of the paper roll wherein the sensor is an adhesive strip. The core of the paper roll comprises a flat surface integrally formed therein, onto which the sensor is affixed.

In another preferred embodiment of the present invention, an electronic surveillance system is provided for protecting an inventory of paper rolls from theft. The system comprises: a means for generating an electronic signal from a sensor at a selected frequency in a detection zone; a paper roll, affixed to which is an electronic sensor, which produces a signal that is detectable by an electronic surveillance system; and detecting means for detecting signals generated by the electronic sensor.

In another preferred embodiment of the present invention, an article of merchandise to be protected from theft is provided. The article comprises a paper roll, further comprising an electronic sensor, wherein the sensor is affixed to the core of the paper roll. In such an article, the sensor is an adhesive strip, and wherein the core of the paper roll further comprises a flat surface integrally formed therein, onto which the sensor is affixed.

It is an object of the present invention, therefore, to provide a paper roll anti-theft protection system that will effectively prevent or inhibit the unauthorized removal of paper rolls from a retailer without disadvantageously affecting the process of loading the paper onto the roll or deforming the paper roll, such that the paper roll is no longer suitable for its intended purpose.

Further, it is an object of this invention to provide paper rolls for use in the above-described anti-theft protection system. Included in this provision are, without limitation, (1) the modified paper roll constructed to permit the addition of an anti-theft sensor, (2) the thus-constructed, modified paper roll to which an anti-theft sensor is affixed, and (3) the thus-constructed, modified paper roll to which the affixed anti-theft sensor is activated and operational. It is also an object to provide the anti-theft sensors used thereon.

It is yet another object of this invention to provide methods of preparing the various paper rolls utilized in the disclosed anti-theft protection system.

Also it is an object of this invention to provide methods of using the disclosed anti-theft protection system to prevent or deter theft of the disclosed paper rolls, particularly those used to produce case register receipts.

Additional objects, advantages and novel features of the invention will be set forth in part in the description and figures which follow, and in part will become apparent to those skilled in the art on examination of the following, or may be learned by practice of the invention.

DESCRIPTION OF THE DRAWINGS

The foregoing summary, as well as the following detailed description of the invention, will be better understood when read in conjunction with the appended drawings. For the purpose of illustrating the invention, there are shown in the drawings, certain embodiment(s) which are presently preferred. It should be understood, however, that the invention is not limited to the precise arrangements and instrumentalities shown.

FIGS. 1A and 1B depict perspective views of an embodiment of the anti-theft paper roll core.

DESCRIPTION OF PREFERRED EMBODIMENTS OF THE INVENTION

Reference is now made to the accompanying Figures for the purpose of describing, in detail, the preferred embodiments of the present invention. The Figures and accompanying detailed description are provided as examples and are not intended to limit the scope of the claims appended hereto.

The invention provided herein relates to methods and systems for preventing or deterring the theft or misappropriation of one or more paper rolls, particularly of those used to produce sales receipts from cash registers. Further provided are the various anti-theft paper rolls of the present invention. "Anti-theft" used herein means preventing, deterring, inhibiting, or hindering the unauthorized removal from a location. This description, however, is intended to be illustrative only and not limiting as to the scope of the present invention. For example, while the invention is described in the context of thermal ink paper cash register receipt rolls used by retailers, the invention is applicable to the broad variety of paper roll types, sizes and applications as well.

In a preferred embodiment of the present invention, an electronic sensor 3 device is attached to a paper roll either by the manufacturer as a source tag, or by the distributor of the paper rolls, as appropriate. Sensor 3 can also be affixed to core 1 of the roll by adhesive, or embedded within a preformed recess in the core, or formed directly into the core during manufacture, so long as the attached sensor 3 operates as intended. (See FIGS. 1A and 1B)

In operation, the paper roll anti-theft system comprises an activated electronic sensor 3, which is affixed to the paper roll. Affixed sensor 3 produces a signal that is detectable by an associated detection device. When the presence or proximity of sensor 3 is detected, an alarm is triggered when sensor 3 passes through or near a detection zone established by the retailer. Thus, upon hearing or viewing the alarm, the store owner, or individual(s) acting on his/her behalf are notified that at least one anti-theft paper roll comprising sensor 3 is being removed from the store without authorization, and the owner of the paper roll can apprehend the thief and prevent the loss of the anti-theft paper roll.

The store owner, or individual(s) acting on his/her behalf are referred to herein as a "retailer." However, when the term "retailer" is used herein, it is also broadly intended to include any entity that uses paper rolls, particularly commercial entities, either retail or wholesale, such as sales stores, outlet stores, warehouses, vendors and the like. Moreover, as used herein, this term is further intended to include non-profit entities and others that use such paper rolls often enough to warrant establishing the present paper roll anti-theft system.

The paper rolls of the present invention are particularly used by such retailers to produce receipts printed by cash registers for the sales of merchandise. However, such rolls are also used to provide paper to printers, reproduction and facsimile machines, and for other devices as they are now known or as they may become known in the art. Moreover, after use, core 1 may recycled by rewinding new paper onto the used core 1.

One or more "detector(s)" of electronic sensor 3, are used in established "detection zones," in the retailer's establishment. A "detection zone" is defined by an electromagnetc field of a varying known frequency. Sensor 3 is constructed such that passing sensor 3 through or near the electromagnetic field, or detection zone, causes sensor 3 to resonate at a frequency within the frequency band of the magnetic field. "Detectors," such as receive antennas and other electronics, detect the presence of sensor 3 and trigger the alarm or other appropriate action. Thus, sensor 3 is detected from any point within the detection zone. U.S. Pat. No. 4,510,489 discloses an example of an electronic surveillance system (EAS).

The detection zones are created at every point of entry or exit to the retailer's establishment. Broadly, such points of entry or exit are referred to herein as "doors," regardless of whether or not an actual door is present to block the entrance or exit of individuals or goods.

The alarm in the paper roll anti-theft system alerts the retailer of the removal of the paper roll through the door/detector zone. When activated or triggered by the proximity of activated sensor 3, a circuit is completed causing the alarm to signal from an alarm device. The alarm is physically within the detector or it may detached therefrom, but connected electronically or remotely by a wired or wireless connection.

The alarm may be audible, such as a beeping or buzzer sound, or it may be visual, such as by one or more flashing light(s), or it may be a silent alarm having a remote indicator (audible, visual or vibrating), or the alarm may signal activation of gates or other escape blocking means. The alarm signal may be continuous or intermittent, and it may persist for a predetermined period of time before ceasing to signal or sound, or it may continue indefinitely until it is turned off or deactivated by authorized personnel. Further, the alarm signal may be detected only by a designated operator, who may be at a designated remote location; or it may be audible or visible only within the detection zone and to those who are proximate thereto; or it may be heard or seen throughout the retailer's entire establishment. Moreover, the alarm may be enhanced or reduced by recognized devices intended for such purposes, e.g., devices of the type used to amplify telephone ringers.

The alarm may be simply ignored by the retailer during the authorized transfers of anti-theft paper rolls or anti-theft paper roll cores 1 through the retailer's door, such as during deliveries or during the removal of used cores 1 in the trash or during recycling; or the detection system is deactivated to prevent the alarm from sounding or signaling during such authorized transfers. As a result, the unauthorized removal of an unused receipt paper roll in the system is detectable, day or night, so as long as the detectors are activated and programmed to be responsive to sensor 3 signal. Thus the retailer is immediately notified if anyone, including an employee, tries to effect the unauthorized removal (borrowing or theft) from the retailer, of one or more unused or partially-used anti-theft paper roll(s). Needless to say, however, if the system is not turned on (activated), or if it is improperly programmed to be responsive to the sensor 3 signal, or if any one door remains unprotected by a detection zone, the purpose of the system, to effectively prevent a theft of the paper rolls, is jeopardized.

Core 1 of the paper roll is a crush resistant cylinder, over which paper is wound to create the paper roll. In a preferred embodiment, and as exemplified, the core cylinder has an interior surface and an exterior surface, between which is the core wall, which has a predetermined and uniform thickness, except at the point wherein sensor 3 is to be affixed, which may differ in thickness from the remainder of the cylinder core. The interior surface of core 1 inscribes a circle when viewed from either end of the cylinder, and having an inside diameter (ID) (see FIG. 1A). The exterior surface of core 1 scribes a circle having an outside diameter (OD) when viewed from either end of the cylinder which is modified to accommodate the placement of a sensor 3. The ends of the cylinder are open.

The paper is wound over the exterior portion of core 1. The exterior portion of core 1 is sized to accommodate the quantity of paper required for each use of the paper roll. The interior portion of core 1 accommodates a mounting rod when the paper roll is installed into a machine for which it is intended, e.g. a cash register.

The length of core 1 ranges from 1 to 50 inches, more preferably 1 to 30 inches, more preferably 2 to 12 inches, and even more preferably 2 to 6 inches. Most preferably, the core 1 length is 2¼, 2¾, 3 and 3¼ inch. As shown in the exemplary embodiment, the paper roll intended for use with a standard electronic cash register is 3⅛ inches in length.

The inside diameter (ID) of core 1 ranges from 1/16 to 3 inches, more preferably ⅛ to 2 inches, and more preferably ¼ to 1 inch, and even more preferably ½ to ¾ inch, and most preferably ¼ to ¾ inch. Most preferably, the inside diameter is 11/16, ⅞ and ⅝ inch. The most preferred ID, as in the exemplary embodiment, is 7/16th inch. This ID is particularly useful for installing the paper roll into a standard electronic cash register.

The outside diameter (OD) of core 1 ranges from ½ to 2 inches, more preferably ½ to 1½ inches, and even more preferably ¾ to 1 inch. The most preferred OD, as shown in the exemplary embodiment, is 13/16 inch. All size measurements (length, ID or OD or the like), provided herein in inches, may also be converted to their equivalents in the metric system.

Figure 1A:
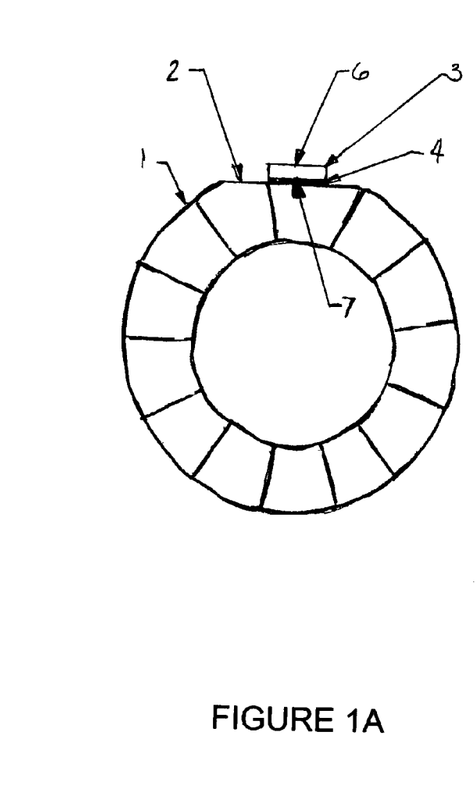
FIG. 1A shows an end view of the core with the sensor attached.
Figure 1B:
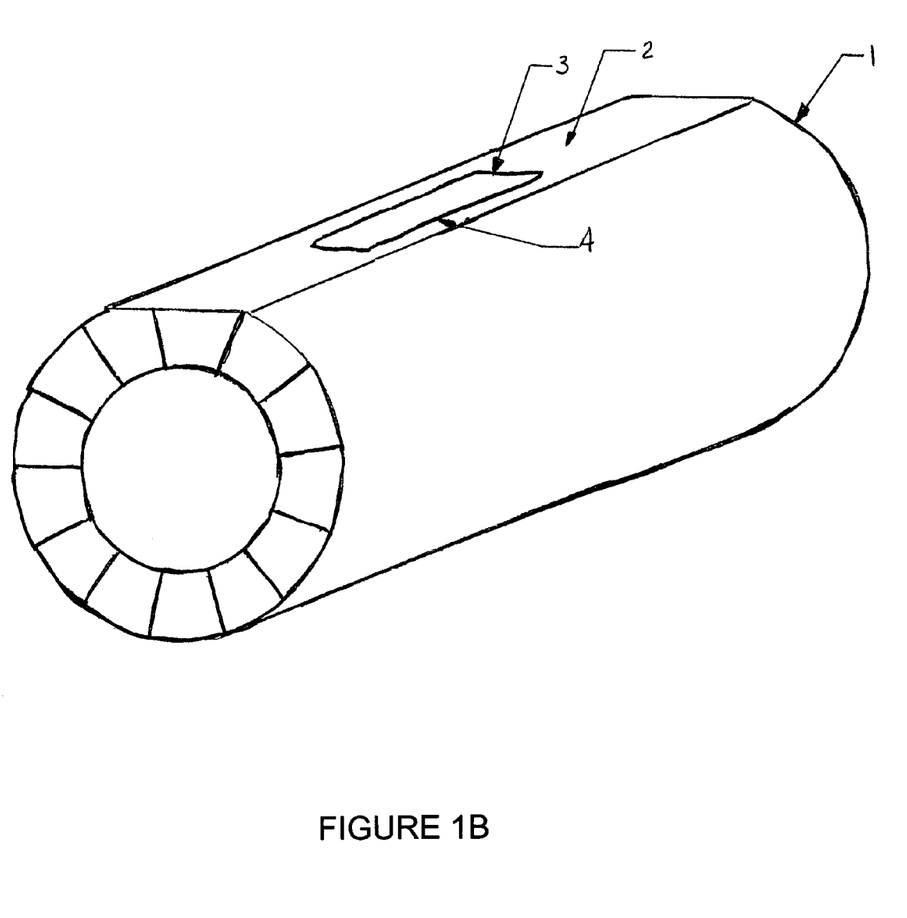
FIG. 1B shows a view along the length of the core with the sensor attached.

In a preferred embodiment, core 1 is constructed of polystyrene in a crush resistant design, as shown in FIGS. 1A and 1B. The material used to form core 1 can be of any known type known in the art to be suitable for core construction, such materials include, without limitation, plastic, fiber, cardboard or paper stock, so long the resulting core 1 is not deformed during the process of winding the paper onto core 1, installing core 1 into the machine for use, or during the use of the paper roll in the machine, such as during the printing of a cash register receipt for a customer. Durable plastics useful for construction of core 1 include, e.g., polyethylene, polypropylene and polystyrene resins or combinations thereof, or any plastic know to one skilled in the art to be suitable for core construction or the intended application.

Crush-resistant designs for core construction are known in the art, and typically comprise a series of distinct or interconnected baffles between the core layer forming the interior surface of core 1 and the core layer forming the exterior surface of core 1, which baffles operate to press apart the inner and outer layers of core 1 in a uniform manner despite unequal pressure on either the inner or the outer layer. The strength and crush-resistance imparted to core 1 is determined by the material selected for use in the core layers or in the baffles between the layers. As a result, such material is selected for core 1, based upon the forces and weights that will be placed upon core 1 during its use, this includes the pressure applied disproportionately to core 1 when sensor 3 is affixed thereto. In the alternative, core 1 may be of solid-wall design, which prevents deformation of core 1. However, solid-wall cores are heavier, and use more material to prepare; whereas, crush resistant designs use less material than a solid wall design and may be more cost effective, providing a durable, inexpensive article of manufacture. It is essential, however, that core 1 retain its intended shape during use, which in the preferred embodiment is circular in cross section.

Plastic cores are manufactured by any known method in the art. For example, cores suitable for use in the present invention may be molded, preformed, assembled or manufactured by an extrusion process. In a preferred embodiment, core 1 is an extruded polystyrene in the crush resistant design shown in FIG. 1A. Labels, instructions or trademark notifications may be printed or stamped onto the cores during their manufacture.

As apparent to one skilled in the art, the present invention comprises various sizes, materials and construction methods in core 1, depending on the application, i.e., the type of paper, the size of paper, the machine into which the paper roll is installed, and the type of imaging onto the paper that are needed. The circular cross section or round shape of core 1 is required by current paper winding machinery to enable the paper to be uniformly wound onto core 1. A misshapen or deformed core 1, i.e., egg shape or ovoid, causes the paper to break or otherwise prevents the paper winding machinery from properly winding paper onto core 1. Thus, any attachment to the exterior surface of core 1, or any bump on the exterior surface or outside diameter of core 1 that exceeds the outside diameter dimension, and that changes or exceeds the round shape of the exterior surface or OD of core 1 may detrimentally affect the process of winding the paper onto core 1, again causing the paper to break or the winding equipment to jam.

As shown on FIGS. 1A and 1B, the OD of core 1 is formed with a specialized section that is a longitudinal flat surface 2 extending for the length of the cylinder in a direction perpendicular to the diameter of core 1, that is, extending from end to end of core 1. Flat surface 2 allows sensor 3 to be attached or affixed to the exterior surface of core 1 without exceeding the outside diameter circular cross section dimension of core 1 and without significantly altering its round shape. In this case, "significant alteration" of the shape means any change that sufficiently causes the resulting cross section to be deformed from round to the extent that the paper breaks during the winding process or the winding equipment jams. In the exemplified embodiment, the flat surface is $5/16^{th}$ inch wide to accommodate sensor 3 on the $13/16^{th}$ inch OD core 1. The width of flat surface 2 may be of any suitable width to accommodate sensor 3, so long as the integrity of core 1 shape and OD of core 1 remains without significant alteration (see FIG. 2).

Flat surface 2 may be of any length, up to and including the entire length of core 1, in order to accommodate various sensor 3 lengths. Additionally, given a selected sensor 3 to be used on a particular core 1, dimensions of the length and width of flat surface 2 are designed or adapted to permit manufacture of core 1. For instance, even though sensor 3 may be shorter in length than the entire length of core 1, the length of flat surface 2 may extend the entire length of core 1, from end to end of the cylinder. On the other hand, flat surface 2 may extend only for the necessary distance to accommodate sensor 3, and the remainder of core 1 exterior surface may remain round, effectively creating a depression in the exterior surface of core 1 for sensor 3.

When using a plastic crush resistant design core 1, of the type manufactured by an extrusion process, such as that which is used in the exemplified embodiment, the plastic tends to exhibit "memory," i.e., plastic material tends to return to its original, in this case round form following deformation. In order to maintain flat surface 2 of the present invention, core 1 construction may be modified. For example as noted in the Example herein, to accommodate core 1 having a flat surface of $5/16^{th}$ inch width on a $13/16^{th}$ inch OD core 1, the content of polystyrene in core 1 was increased from 1.75 g/inch to 2.40 g/inch, to maintain the dimensional stability and avoid deformation of core 1, i.e., maintaining a circular cross section for all but flat surface 2, and to maintain strength, i.e., the ability of core 1 to hold the circular shape during processing and use.

The sensors 3 used in the present invention are of any type known to one skilled in the art of such sensors 3, who would also know to select which sensors 3 are suitable for or can be adapted to use on a paper core 1, such as those produced by a number of recognized manufacturers in the sensor design field. Such sensors 3 transmit radio frequencies as signals that are not blocked by the amount or thickness of the paper on the paper roll. Such sensors 3 can be harmonic generating or magnetomechanical type, most preferably the latter.

Moreover, in the preferred embodiments dimensions of the width and length of flat surface 2 of core 1 are sized to accommodate the dimensions of sensor 3. For example, in the exemplified embodiment, sensor 3 used is model Ultra Strip III product number 2ZLDR7K51 (ADT Secirury Systems, Inc., Bacon Raton, Fla.), requiring a flat surface 2 of $5/16^{th}$ inch width on a $13/16^{th}$ inch OD core 1. Those skilled in the art of manufacturing would know how to select core 1 size and dimensions of flat surface 2 to meet the dimensions of selected sensor 3, or they would know that a different sensor 3 is necessary to confirm to the requirement to maintain the uniform OD of core 1.

As shown on FIGS. 1A and 1B, sensor 3 is attached to core 1 with an adhesive 4. One skilled in the art of adhesives or chemistry would be aware of various adhesives and adhesive methods currently available or yet to be developed which may be used to attach sensor 3 to core 1. Such adhesive may be pressure sensitive, temperature sensitive or chemically activated or the like, although pressure sensitive adhesives are preferred. Acceptable adhesive compositions for use in the present invention include, but are not limited to pressure sensitive adhesive, such as that provided by Avery Dennison (Brea, Calif.). In the preferred embodiment, a double-faced, pressure sensitive tape is used.

Adhesive 4 may be an integral part of sensor 3, or it may be an integral part of core 1 before sensor 3 is applied to core 1. However, if applied to core 1, rather than to sensor 3, the area covered by adhesive 4 may be no greater than the area of sensor 3 being affixed thereto. In the alternative, an adhesive is applied to sensor 3 and another adhesive is applied to core 1. The composition of such adhesive(s) may be the same on both sensor 3 and core 1, or different, or the adhesive(s) may be designed to enhance the bonding effect of either one alone. In yet another alternative, an adhesive 4 is applied to sensor 3 and an adhesive activator is applied to core 1.

Adhesive 4 may be applied to the surface of sensor 3 and/or core 1 as a preformed, double-sided adhesive strip, or as a separately applied fluid (liquid or gel) adhesive or bonding agent. Adhesive 4 may be applied by spray or applied by brush or applicator as a layer. When adhesive 4 is provided as a preformed strip, the adhesive side(s) of such strip may be protected by a protective coating of paper, cellophane, plastic polymers or the like, until the adhesive side of the strip (which may be both sides) is applied to the surface of sensor 3 and/or core 1, respectively. One skilled in the art would be aware of the various application methods suited for the applying adhesive 4 to sensor 3 and/or core 1 for the particular paper roll application. Alternatively, sensor 3 may be packaged comprising a pre-applied adhesive 4, such that a number of sensors 3 are mounted to a sheet comprising a removable paper or plastic backing.

In practice, sensor 3, having an upper surface 6 and a lower surface 7, may comprise an adhesive 4 on lower surface 7 of sensor 3, wherein when the paper roll is assembled, lower surface 7 of sensor 3 is placed onto the exterior surface of core 1, and wherein upper surface 6 of sensor 3 is proximal to the paper wound onto core 1. In the alternative, the exterior surface of core 1, may comprise an adhesive 4, such that when lower surface 7 of sensor 3 is placed onto adhesive 4 on core 1, it is held in place while the paper roll is assembled so that upper surface 6 of sensor 3 is proximal to the paper wound onto core 1. Adhesive(s) 4 may be applied to sensor 3 or to core 1, or to sensor 3 and core 1, either manually or by machine using known means in the art.

Sensor 3 may be attached to core 1 manually or by machine. An effective amount of adhesive 4 must be used to secure sensor 3 to core 1. By "effective amount" is meant a sufficient amount of adhesive 4 such that sensor 3 is firmly held in place and will not be dislodged during the process of winding the paper onto core 1, or during the use of the paper roll on the intended machine. Moreover, an effective amount of adhesive 4 does not exceed the actual area of contact between lower surface 6 of sensor 3 and the exterior surface of core 1. In other words, when pressure is applied to sensor 3 during preparation of the anti-theft paper roll, the adhesive 4 is not forced out beyond the lower surface area of sensor 3, and does not contact the paper being wound onto the roll.

In the preferred embodiment, when electronic sensor 3 is affixed to core 1, sensor 3 may be oriented in either direction on core 1, so long as no surface of sensor 3 interferes with the outside diameter dimension of core 1. Installing sensor 3 on core 1 without causing distortion to the OD dimension of core 1 allows the paper to be wound on core 1 without alteration to the winding process, damage to the paper or disruption of the winding equipment. The electronic function of the sensor 3 is not affected by its orientation on core 1. Nevertheless, certain sensors 3 selected for use in the paper roll anti-theft system may be affected by orientation, whereupon those sensors 3 must be affixed the core 1 in whichever orientation will permit proper transmission of the signal to the detector.

Figure 2:
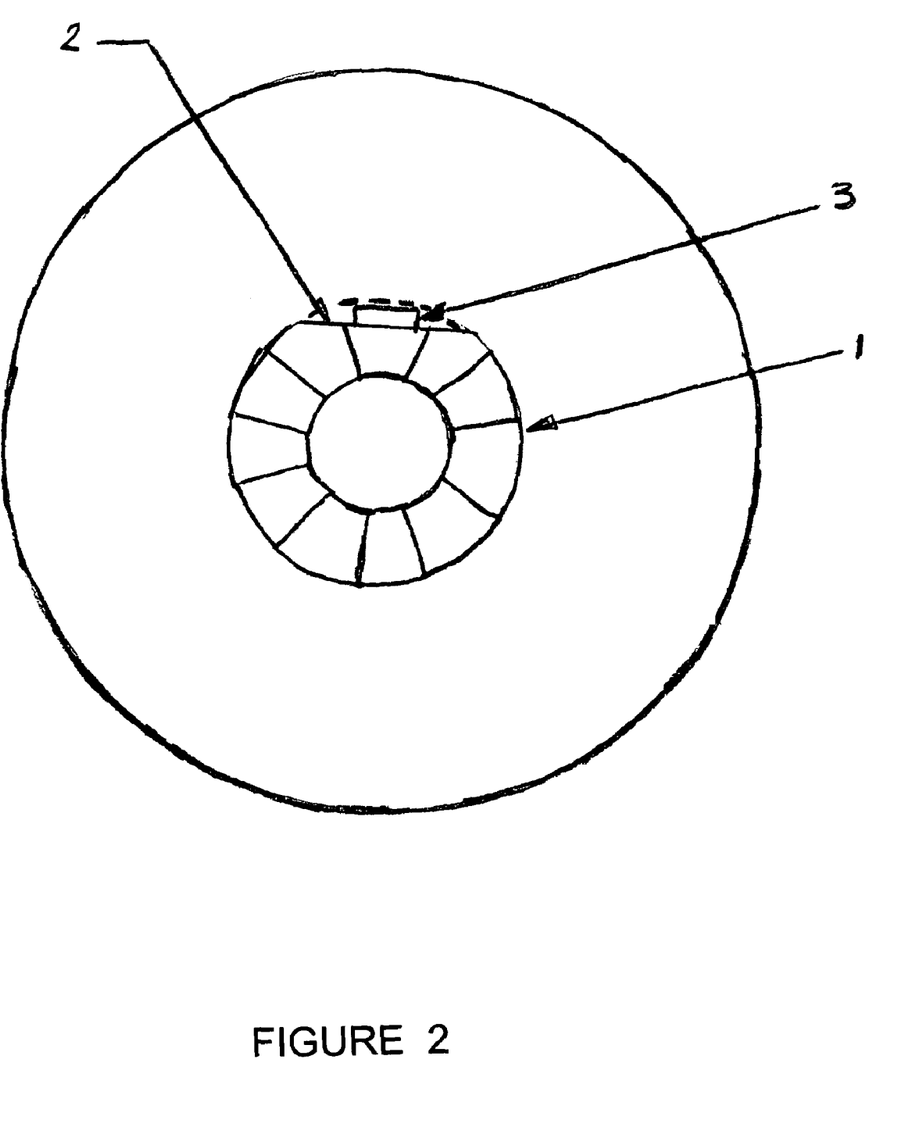
FIG. 2 shows an end view of an embodiment of an anti-theft paper roll.

In the preferred embodiment, when electronic sensor 3 is affixed to core 1, sensor 3 must be attached in such a way so as no surface of sensor 3 interferes with, or exceeds the outside diameter dimension of core 1 (see FIG. 2). If sensor 3 surface exceeds the outside diameter dimension of core 1, sensor 3 may come into physical contact with either the paper being wound onto core 1, or components of the paper winding machinery. When sensor 3 comes into contact with the paper or the paper winding machinery, sensor 3 may be damaged or desensitized, and thereby be rendered ineffective. Nevertheless, certain sensors 3 selected for use in the paper roll anti-theft system may not be affected by contact with the paper or the paper winding machinery, whereupon those sensors 3 may be affixed the core 1 in such a way as to not effect the paper winding process, and to permit proper transmission of the signal to the detector.

The inside diameter of core 1 is unaffected by the mounting of sensor 3. However, in the process of preparing the anti-theft paper roll of the present invention, as described in the Example which follows, a preferably solid, cylindrical loading rod (round cross-section) is inserted longitudinally through the hollow center of core 1 to load and transfer core 1 into the machinery that wraps the paper onto core 1. The loading process occurs either before sensor 3 is affixed to core 1, and the attachment of sensor 3 onto each core 1, takes place while core 1 is in place on the loading rod; or in the alternative, it occurs after sensor 3 is has already been affixed to core 1, and the core/sensor combination is loaded onto the rod.

During the paper winding process, a minimal amount of play is required between the outer surface of the loading rod and the inside diameter of core 1. This minimal space between the rod and core 1, allows core 1 to float on the rod, so that damage or desensitization of sensor 3 on the core 1 is prevented or avoided during processing, and so that a lack of flexibility does not cause the paper to break when the paper is wound around core 1. For example, in the preferred embodiment, a loading rod having an OD of ⅜ inch was used for core 1 having an ID of 7/16 inch, leaving a space between the two of 1/16$^{th}$ inch. Thus, the ID dimension of core 1 must be a minimum of 1/16$^{th}$ inch greater than the OD dimension of the loading rod to provide adequate play during the paper wrapping process to prevent damage to sensor 3 or the paper. As one skilled in the art would be aware, alternative methods of winding the paper onto core 1 are available which do not require a loading rod, depending upon the machinery used to wind the paper and assemble the anti-theft paper roll.

In an alternative embodiment, sensor 3 may be affixed to the completed paper roll per se, rather than to core 1. In practice, when sensor 3 is affixed to the outside of the processed and assembled paper roll, or to the packaging material surrounding the processed and assembled paper roll, such sensor 3 is physically removed immediately prior to use of the paper roll in the register.

The present invention is further described in the following example. This example is provided for purposes of illustration only, and is not intended to be limiting unless otherwise specified. The various scenarios are relevant for many practical situations, and are intended to be merely exemplary to those skilled in the art. This example is not to be construed as being limiting the scope of the appended claims. Thus, the invention should in no way be construed to encompass any and all variations which become evident as a result of the teaching provided herein.

EXAMPLE

To determine an operable method for preparing the paper rolls comprising a sensor for the paper roll anti-theft system, the following process was developed and novel components created.

The initial core selected was the type of core that is currently utilized on cash register paper rolls for use in standard cash registers. Such paper rolls are currently prepared by winding the paper onto the core in accordance with industry size and dimension standards using current winding machinery, e.g., the Dusenbery (Randolph, N.J.), Goebel, (Germany), Jennerjahn Mahine, Inc., (Mathews, Ind.), and the like to wind the paper selected for the particular application, e.g., thermo ink cash register receipt paper, onto the core. The current winding process comprises loading the pre-manufactured hollow core onto a loading rod, which is then loaded into the winding machine.

Once selected for its intended application, the shape and size of the core for that application are crucial for the proper winding of the paper. The selected, standard cash register receipt paper roll core was an extruded polystyrene cylinder of crush-resistant design. The core is 3⅛ inch long, having an inside diameter of 7/16 inch and an outside diameter of 13/16 inch. To be adaptable to use in current winding machines, it is essential that the core cylinder must be round in shape.

A pre-designed and commercially available sensor was chosen for use in the paper roll anti-theft system. The selected sensor was the sensor element of a recognized, commercially-available standard electrical surveillance system (EAS), because it could be adapted by the manufacturer to meet the specifications of the present invention, and because use of a standard sensor would require little or no modification of the current detectors and security systems of the retailers. The anti-theft system of the present invention was designed so that a sensor is attached to each paper roll core, thereby protecting each paper roll individually.

The sensor, ADT product number 2ZLDR7K51 (ADT Security Systems, Inc.) was chosen as a suitable size to be attached to the selected core design. These particular sensors were supplied with an adhesive backing, and could be applied to the core either manually or with a machine.

When the sensor was simply affixed to the manufactured core, the sensor formed an external bump on the outer surface of the core, thereby disrupting the round shape of the core. As a result, in repeated efforts to load the paper onto the sensor/core combination, after it was placed onto the paper winding machinery, the paper broke before it was completely wound onto the core. Although it did not always break at the same point in every test, it did, in fact, break in every trial. Moreover, it was discovered that the pressure of the wrapped paper on the sensor affixed to the core, in each case damaged or desensitized the sensor.

In order to overcome these problems, a novel core design was developed. The novel core design provided a flat segment in the outer surface of the 3⅛ inch long polystyrene core, which also had an inside diameter of 7/16 inch and an outside diameter of 13/16 inch. The sensor was then attached to the flat segment of the core, such that the attached sensor created no bump on the outer surface of the core that would affect the proper winding of the paper. Additionally, because the sensor was attached to the core within the outside diameter dimension of the core, when the paper was wound onto the core, the sensor was not brought into contact with the paper or the paper winding machinery. As a result the sensor was not damaged or desensitized during the winding process.

The novel core was initially constructed using the previously known crush-resistant design as the standard core, however, the novel core was designed to include on its outer surface a 5/16 inch wide flat surface, which extended longitudinally for the entire length of the core. The 5/16 inch flat surface was selected to accommodate the chosen sensor, so that the sensor firmly attached to the core, but did not interfere with the outside diameter dimension of the core.

However, it was found that during the manufacture of the novel core, the polystyrene did not hold the flat surface design. Rather, because polystyrene has a memory characteristic, the flat part of the core tended to return to the round shape. In order to overcome this problem, and to provide and manufacture an economically feasible paper roll core for the paper roll anti-theft system, a series of trials were performed in which the core was constructed of increased amounts of polystyrene (data not show).

As a result of the trials, it was concluded that the optimal amount of polystyrene for the core construction was increased from 1.75 g/inch (used in standard cash register receipt paper roll cores) to 2.40 g/inch in the novel core to provide the adequate strength and stability for the core to maintain the region of flat surface during the core manufacturing process. The previously selected sensor was then affixed to the flat surface of the novel core, and the sensor/core combination was placed into the paper winding machinery. The previous problem with the bump on the outer surface of the core was no longer an issue and the core shape did not deform the winding of the paper on the paper roll.

Nevertheless, additional tests of the novel paper roll core to which the sensor was affixed yielded inconsistent paper loading results when tested for paper winding on the paper winding machinery. It was determined that there was a critical relationship between the circular inside diameter of the hollow core and the circular outside diameter size of the loading rod used to load the cores in the winding machine. The original novel core had a 7/16 inch inside diameter, while the loading rod being used had an outside diameter greater than 3/8 inch. As a result the paper broke when the core/sensor combination was tested in the paper winding machine. The difference of less than 1/16 inch between the two diameters of the core and the rod caused varying amounts of play for the core on the rod during the paper winding process, as a result the core was periodically jerked throughout the winding process, causing the paper to break.

Further operational tests identified the problem and it was determined that without an adequate amount of play for the core to slip to some extent during the winding process, the paper would continue to break and could not be properly wound onto the core with the sensor in place. However, by using a loading rod with an outside diameter of exactly 3/8 inch or less, a suitable amount of play was provided for the 7/16 inch inside diameter core, and the paper winding machine was able to properly load the paper onto the core. Thus, a variation of at least 1/16 inch between the outside diameter dimension of the loading rod and the inside diameter dimension of the core was determined to provide optimal paper loading characteristics. When the novel paper roll core/sensor combination was then tested, using the loading rod at a proper ratio to the inside diameter of the novel core, the paper rolls comprising the sensor were uniformly and reliably generated. Also, the flat surface of the novel core was maintained when tested in the paper winding process and when the resulting paper roll was tested in a standard cash register. Moreover, the activated sensor remained active and generated an alarm signal in the corresponding detector when the thus-prepared paper roll anti-theft system was tested.

Each and every patent, patent application and publication that is cited in the foregoing specification is herein incorporated by reference in its entirety.

While the foregoing specification has been described with regard to certain preferred embodiments, and many details have been set forth for the purpose of illustration, it will be apparent to those skilled in the art that the invention may be subject to various modifications and additional embodiments, and that certain of the details described herein can be varied considerably without departing from the spirit and scope of the invention. Such modifications, equivalent variations and additional embodiments are also intended to fall within the scope of the appended claims.

What is claimed is:

1. An electronic article surveillance system comprising:
   a rigid cylindrical core having a length of between 2¼ to 3¼ inches;
   a sensor interconnected to the core, the sensor producing a detectable signal;
   a length of register receipt paper wound about the core and sensor; the core and register receipt paper together constituting the register receipt roll;
   a detector for detecting the signal generated by the sensor so as to prevent the unauthorized removal of the register receipt roll.

2. The system of claim 1, wherein the regular receipt paper is thermal paper.

3. The system of claim 1, wherein the core further comprises an exterior surface with a flat surface integrally formed thereon, and wherein the system further comprises affixing the sensor to the flat surface of the core.

4. The system of claim 1, wherein the signal activates an alarm.

5. The system of claim 4, wherein the alarm is at least one audible indicator, visual indicator, silent alarm having a remote indicator, or activation of a physical blocking means, and combinations thereof.

6. The system of claim 4, wherein the alarm is recognized at a remote location.

7. The system of claim 4, wherein the alarm is recognized proximal to the detection zone.

8. A method for preparing an anti-theft paper register receipt roll for preventing unauthorized removal from a retailer, comprising:
   providing a rigid plastic core with an electronic sensor secured thereto, the core having a length of between 2¼ and 3¼ inches to facilitate its use within a register and wherein the sensor produces a detectable signal;
   winding a length of thermal ink paper over the rigid plastic core, the thermal ink paper having a length that corresponds to the length of the rigid plastic core; and
   detecting the signal from the sensor when it passes through or near a detection zone at the retailer's location, thereby preventing unauthorized removal of the paper roll.

9. The method of claim 8, wherein the sensor is secured to the outside surface of the rigid plastic core.

10. The method as described in claim 8 wherein the rigid plastic core includes a hollow cylinder having an interior surface and an exterior surface, between which surfaces is a core wall, and wherein the exterior surface further comprises a longitudinal flat surface integrally formed therein.

\* \* \* \* \*